United States Patent

Sommazzi et al.

[11] Patent Number: 5,408,030
[45] Date of Patent: Apr. 18, 1995

[54] PREPARATION OF ALTERNATING OLEFIN/CARBON MONOXIDE COPOLYMERS BY MEANS OF A HETEROGENEOUS SUPPORTED CATALYST

[75] Inventors: Anna Sommazzi, Mazzini; Gabriele Lugli, San Donato Milanese; Fabio Garbassi, Novara; Fausto Calderazzo, Ghenzzano; Daniela Belli Dell'Amico, Pisa, all of Italy

[73] Assignee: Enichem S.p.A., Milan, Italy

[21] Appl. No.: 198,274

[22] Filed: Feb. 18, 1994

Related U.S. Application Data

[62] Division of Ser. No. 26,022, Mar. 4, 1993, Pat. No. 5,314,856.

[30] Foreign Application Priority Data

Mar. 5, 1992 [IT] Italy ............................. MI92A0484

[51] Int. Cl.6 ............................................. C08G 67/02
[52] U.S. Cl. .................................. 528/392; 502/162; 502/167
[58] Field of Search ................. 528/392; 502/162, 167

[56] References Cited

U.S. PATENT DOCUMENTS

| | | | |
|---|---|---|---|
| 4,940,776 | 7/1990 | Bakkum et al. | 528/392 |
| 5,055,552 | 10/1991 | Woneg | 528/392 |
| 5,237,047 | 8/1993 | Keijsper | 528/392 |

Primary Examiner—John Kight, III
Assistant Examiner—Shelley A. Dodson
Attorney, Agent, or Firm—Oblon, Spivak, McClelland, Maier & Neustadt

[57] ABSTRACT

A catalyst active in the preparation of alternating olefin/carbon monoxide (CO) copolymers is constituted by:

(a) $Pd(O_2CNEt_2)_2(NHEt_2)_2$ supported on a solid carrier preferably constituted by hydroxylated silica,
(b) an either mono- or bidentate ligand containing one or two nitrogen or phosphorous atoms capable of linking to Pd atom by dative bonds,
(c) a mineral or organic acid.

Disclosed are the preparation of the catalyst and the use of said catalyst in alternated copolymerization of ethylene (C2) and/or other olefins with carbon monoxide (CO).

15 Claims, No Drawings

PREPARATION OF ALTERNATING OLEFIN/CARBON MONOXIDE COPOLYMERS BY MEANS OF A HETEROGENEOUS SUPPORTED CATALYST

This is a division of application Ser. No. 08/026,022, filed on Mar. 4, 1993, now U.S. Pat. No. 5,314,856.

The present invention relates to a complex palladium catalyst supported on a solid carrier, to its preparation and to its use in the copolymerization of ethylene (C2) and/or other olefins with carbon monoxide (CO) in order to produce alternated copolymers with regular morphology.

From the prior art, catalytic systems capable of yielding alternating C2/CO polymers are known and widely described. Mostly, these are catalytic systems based on Pd salts, or based on salts of other metals belonging to group VIII of the periodic system and containing an either mono- or bidentate ligands capable of binding to the metal atom through dative bonds and a mineral and/or organic acid; such catalytic systems are capable of copolymerizing ethylene (C2) and/or other compounds containing unsaturations of olefinic type with carbon monoxide (CO), yielding alternating copolymers.

So, for example, in U.K. Patent No. 1,081,304 there is disclosed the solution polymerization of monomeric mixtures of C2 and CO in order to yield alternating copolymers by means of the use of an alkyl phosphinic complex of a Pd salt, and U.S. Pat. No. 3,689,460 claims a catalyst based on a tetrakisphosphinic palladium complex. Analogous catalytic systems are disclosed in U.S. Pat. No. 3,694,412.

Unfortunately, such catalytic compositions have a practically zero industrial applicability both due to the rather complex nature of the Pd salts used and due to their inherent low production rate; in fact, polymer yields are of the order of 35 g/g of Pd and even lower.

A considerable improvement of the prior art was accomplished by means of the use of ternary catalytic systems represented by: (1) a palladium, nickel or cobalt salt of a preferably carboxy acid, (2) a phosphorous bidentate base, generally constituted by an alkyl or cycloalkyl hydrocarbon simmetrically substituted with two dialkyl- or diphenylphosphinic moieties and (3) an anion of an acid, preferably an organic acid, with a pka value of approximately 2. Such catalytic systems are disclosed, e.g., in EP Patent Nos. 0 121 965, 0 222 454, 0 257 663, 0 305 012 and make it possible alternating C2/CO polymers to be obtained with yields which, in some cases, are closed to 6000 g of polymer/g Pd/hour.

Some modifications of the above approach consist in adding to the catalytic systems a fourth component selected from compounds belonging to the groups of quinones, organic oxidizers and aromatic nitrocompounds, according to as claimed, e.g., in European Patents EP No. 239 145 and EP No. 245 893, and so forth, or in the use of bidentate bases with both heteroatoms constituted by nitrogen, or mixed heteroatoms P and S, such as disclosed, e.g., in European Patents EP No. 245 893 and EP No. 343 734.

The above cited catalytic systems are generally homogeneous and hence soluble in the reaction medium, which is generally constituted by a diluent in which the polymer formed is insoluble; however, a portion of this polymer can settle and adhere to the reactor walls, as well as to the mobile parts of said reactor, such as the paddles and the stem of the mechanical stirring means, generating crusts which considerably reduce the efficiency of heat exchange and the useful reactor volume, and which cannot be easily removed but mechanically and discontinuing the polymerization process.

The phenomenon of reactor fouling was considerably reduced down to lower values than 10% of deposited polymer, based on total produced polymer, by carrying out the polymerization of both monomers in the presence of a ternary catalytic system similar to those mentioned above, but with the bidentate ligand being supported on silica; the anchoring thereof to the carrier was obtained by replacing the previously mentioned bidentate base (generally a bidentate phosphorous base) with an analogous base which is capable of reacting with the reactive groups of the carrier (silica) by means of a reactive group [—OH, —Si(OR)$_3$, and so forth] present in the same base; the other catalyst components remain the same and as defined in the prior patents.

A heterogeneous catalytic system of this type was disclosed in European Patent Application EP No. 0 404 228 and is prepared by means of a 2-step process, in which, in the first step, the bidentate compound is linked to the siliceous carrier by reacting the reactive group with silica's hydroxy groups, and in the second step the supported bidentate compound is caused to react with the Pd salt. In this way, palladium results to be linked to the carrier through the bidentate ligand.

However, with such catalytic systems the drawback of reactor fouling is overcome to the expense of polymer yields, which are lower than as reported in previously cited patents, and relevent to the same catalytic systems, in non-supported form.

However, the most serious drawback of such heterogeneous catalytic systems is due to the complex system or bidentate ligand anchoring carrier, which considerably increases the catalyst costs, both because it makes it mandatory special bidentate bases to be used which contain the reactive groups for the carrier, and because the catalytic system preparation is complicated by the need for causing the ligand to first react with the carrier, and then the resulting solid to react with palladium salt.

Therefore, from the prior art it is evident that obtaining, with high yields, alternating ethylene/carbon monoxide copolymers to be obtained with phenomenon of reactor fouling being simultaneously controlled, is not yet possible.

It furthermore also results that the phenomenon of reactor fouling cannot be limited by using a cheap and easily prepared catalytic system.

Therefore, the subject-matter of the present invention is a catalytic system based on a supported palladium complex, active in the preparation of alternating copolymers of olefins with carbon monoxide (CO), which display a high catalytic activity, simultaneously in the presence of a limited fouling of the polymerization reactor, and which is easily prepared, because it does not require the complex methodologies for catalyst anchoring to the carrier, as briefly mentioned hereinabove.

In fact, the present Applicant surprisingly found that alternating copolymers of olefins with carbon monoxide (CO) can be prepared by using heterogeneous, palladium-based catalytic systems in which Pd atoms are chemically bound to a solid carrier by means of strong bonds which prevent it from going into solution. These systems which, differently from those known from the prior art (EP No. 0 404 228) do not require the ligand to be preliminarily anchored to the carrier, can be obtained by using palladium carbamate complexed with diethylamine.

In accordance therewith and according to a first aspect, the present invention relates to a heterogeneous catalytic system active in the preparation of alternating copolymers of olefins with carbon monoxide (CO), constituted by:

(a) the solid compound produced from the interaction of

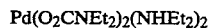

Pd(O$_2$CNEt$_2$)$_2$(NHEt$_2$)$_2$ with a solid carrier, (b) a mono- or bidentate ligand containing one or two nitrogen or phosphorous atoms, capable of binding to Pd atom through dative bonds, (c) a mineral or organic acid.

The present invention relates also, and this is a second aspect of the present invention, to the use of such a catalytic system in the alternating copolymerization of ethylene (C2) and/or other olefins with carbon monoxide (CO).

As it is briefly mentioned above, the component (a) of the catalytic system is constituted by the solid reaction product of Pd(O$_2$CNEt$_2$)$_2$(NHEt$_2$)$_2$ with an inorganic carrier containing reactive functional groups; basic feature of Pd(O$_2$CNEt$_2$)$_2$(NHEt$_2$)$_2$ is of being capable of reacting with the —OH groups of the carrier yielding strong chemical bonds between said carrier and Pd atom, which prevent said rd atom from going into solution even after repeated treatments with the solvents used in the olefin polymerizations; it is not available from the market, but is very easily prepared by starting from commercial products and hence is regarded as commercially available.

An example of synthesis of Pd carbamate complexed with the amine can be found in the paper published in Gazzetta Chimica Italiana 119, pages 653–655, (1989).

The solid carrier for preparing the component (a) according to the present invention is a compound belonging to the group of those inorganic compounds which are insoluble in usual solvents and are characterized in having reactive functional groups on their surface, generally hydroxy groups, which are capable of shifting Pd atom from the anion of its salt, and stably binding it to its skeleton, turning into insoluble.

As a class of representative products for such carriers, the high surface area material can be mentioned, which are normally available from the market, such as man-made or natural zeolites, aluminas and silicas.

The preferred carrier for the purposes of the present invention is constituted by a high specific surface area silica (specific surface area larger than 200 m$^2$/g), still having on its external surface a considerably high concentration of hydroxy groups capable of stably binding Pd atom to its surface, through Si-O-Pd linkages.

In order to carry out the experiments reported in the following examples, the commercial silica grade 3217-50 manufactured by Grace was used.

Inasmuch as, the moisture and hydroxy groups levels of a silica of the above said type may vary within a wide range, submitting the commercial silica to a preliminary drying treatment under vacuum and at temperatures comprised within the range of from 100° to 250° C. results to be advantageous in order to obtain reproducible, high-activity catalytic systems. After this treatment, no spectroscopic evidence can be obtained that silica still retains water molecules on its surface, and consequently any present —OH groups have to be exclusively attributed to the ≡Si—OH moieties belonging to silica skeleton.

The interaction between the palladium salt and the so prepared carrier is carried out by suspending the inorganic carrier in a suitable solvent such as, e.g., toluene, and adding to the resulting suspension the Pd(O$_2$CNEt$_2$)$_2$(NHEt$_2$)$_2$ complex, previously dissolved in the same solvent; the interaction is accomplished at temperatures comprised within the range of from −10° to +50° C., and the required reaction time is of approximately 8–12 hours.

The reaction is carried out with such a ratio (solid carrier)/(palladium carbamate) as to secure that all Pd present in solution is fixed onto the surface of the same carrier. For indicative purposes, in the event when a silica carrier is used, ratios of silica:Pd carbamate comprised within the range of from 00:20 to 99:1, by weight, can be used. Preferred value for such ratio of silica:Pd carbamate, by weight is 90:10.

When the reaction is complete, the suspension can be used as such in order to prepare the end catalytic system, or the solid material can be separated, washed, dried and subsequently used as the component (a) of the catalytic system.

As the component (b) of the catalytic system, a monodentate or bidentate base (ligand) may be used.

The monodentate bases suitable for the purpose of the present invention are those compounds which contain a heteroatom such as nitrogen or phosphorous, and hence are capable of complexing Pd, as possible examples of monodentate bases, aliphatic, cycloaliphatic, aromatic monophosphines, such as triphenylphosphine, triethylphosphine, tributylphosphine, and so forth, and aliphatic or aromatic amines, such as triethylamine, diethylamine, diphenylamine, and so forth, can be cited herein; however, it resulted from the experiments that the bidentate bases are generally to be preferred to monodentate ones.

Bidentate bases suitable for the purposes of the present invention are compounds which contain two heteroatoms, such as two nitrogen atoms or two phosphorous atoms and correspond to the general formula

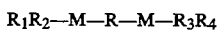

R$_1$R$_2$—M—R—M—R$_3$R$_4$ in which:

M represents a phosphorous or nitrogen atom,

R stands for a polymethylene radical containing from 2 to 4 carbon atoms, cycloalkylidene radical containing from 2 to 10 carbon atoms, an ortho-phenylene radical, R$_1$, R$_2$, R$_3$, and R$_4$, which are the same or may be different from each other, represent an alkyl radical of from 1 to 6 carbon atoms, a cycloalkyl radical of from 3 to 6 carbon atoms, an aromatic radical of from 6 to 12 carbon atoms, possibly with substituents.

Inasmuch as, the bidentate chelating agent forms a complex on Pd through both of its heteroatoms, the total number of atoms which constitute the complex ring should preferably be not higher than 7, that means that the total number of carbon atoms in the polymethylene radical R should preferably not exceed 4; if, on the contrary, R is constituted by a cycloalkylidene radical, the latter will preferably carry both its chelating atoms bound to two adjacent atoms in the ring.

Basing on the above, examples of bidentate chelated bases containing two phosphorous atoms are: 1,3-bis(diphenylphosphino)propane, 1,4-bis(dicyclohexylphosphino)butane and 1,2-bis(diphenylphosphino)cyclohexane; examples of nitrogenous bidentate chelating ligands can be hexamethylenediamine, tetramethylethylenediamine, 1,2-disminocyclonexane, and so forth; other bidentate bases containing two nitrogen atoms, which do not belong to the group of chelating compounds which can be represented by the general formula (I), but which can be used in order to form the catalytic systems of the present invention are 1,10-phenanthroline, 3-methyl-1,10-phenanthroline, 2,2'-bipyridyl and 4,4'-dimethyl-2,2'-bipyridyl.

The component (c) of the catalytic system of the present invention is a mineral or organic acid with no particular requirements as regards its strength, provided that its pKa is lower than 5; examples of organic or mineral acids useable according to the present invention are: trifluoroacetic acid, p-toluene sulfonic acid, sulfuric acid, or alkane sulfonic acids, which may be used either as single compounds, or as mixtures with each other.

The end catalytic system is obtained by adding to the previously obtained suspension of the component (a) in the solvent, the other two components of the catalytic system, i.e., respectively, the component (b), i.e., the monodentate or bidentate base (ligand), and the component (c), i.e., the mineral or organic acid. The resulting suspension is then ready for use in the synthesis of the alternating polymers.

As solvents, the aliphatic hydrocarbons, aromatic hydrocarbons, mixed aromatic-aliphatic hydrocarbon blends, linear or cyclic ethers, such as, e.g., ethyleneglycoldimethylether and tetrahydrofuran, may be used.

The molar ratio of supported palladium to the mono- or bidentate ligand [the component (b) of the catalytic system] to be added to the reaction medium can be comprised within a wide range, even if preferred value of such ratio is not very different from the stoichiometric values; such values are comprised within the range of from 1:2 to 1:4, mols of Pd:mols of base, in the event when the component (b) is constituted by a monodentate base, and of from 1:1 to 1:4, preferably 1:1, mols of Pd:mols of base, in the event when the component (b) is constituted by a bidentate base.

The ratio of the component (c) to supported Pd may vary within the range of from 100:1 to 10:1. In the preferred case when the component (c) is constituted by trifluoroacetic acid, the latter is added to the reaction medium in amounts corresponding to molar ratios comprised within the range of from 15 to 25 mol/mol of Pd; preferably, the molar amount of trifluoroacetic acid is 20 times as high as the amount of Pd (as mols).

The heterogeneous catalyst is preferably constituted by (a) the solid compound produced from the interaction of $Pd(O_2CNEt_2)_2(NHEt_2)_2$ with a silica, (b) a bidentate ligand constituted by a bisdiphenylphosphine, such as 1,3-bis(diphenylphosphino)propane and, (c) an organic acid and, preferably, trifluoroacetic acid.

The reaction of polymerization of the monomers, respectively the olefinic component, or the mixture of a plurality of olefins, and carbon monoxide is carried out in a sealed reactor preliminarily charging the solvent, the component of the catalytic system and the monomers, at a temperature comprised within the range of from 50° to 100° C., under a pressure comprised within the range of from $4 \times 10^5$ Pa to $100 \times 10^5$ Pa, and for a polymerization time comprised within the range of from 3 to 9 hours.

By carrying out the copolymerization of CO with one or more monomers containing olefinic unsaturations and in the presence of the heterogeneous catalyst according to the present invention, exactly alternating CO/olefin copolymers are obtained with high yields, of more than 4000 g of polymer/g of Pd/hour, with a simultaneous and considerable reduction of the reactor fouling level, which results to be of less than 10%, based on produced polymer, as reported in the following examples.

The exact alternation of the copolymer obtained according to the present invention was veryfied by using a spectroscopic system described in the literature and precisely in "Application of Polymer Spettroscopy" by E. G. Brame, published by Accademic Press (1978), page 19.

The activity of the catalyst according to the present invention is such that from $10^{-2}$ to $10^{-5}$ gram-atoms of Pd are charged to the reactor per each olefin mol charged to the same reactor.

According to a preferred process, the polymerization reaction is carried out in an alcoholic or ethereal solvent, preferably methanol or dimethoxy ethane, containing the catalytic system, with CO/olefin mixtures with ratios of CO:olefins, by mol, comprised within the range of from 5:1 to 1:5 and preferably with a ratio of CO:olefins of 1:1 by mol, under pressures comprised within the range of from $50 \times 10^5$ to $60 \times 10^5$ Pa, at temperatures comprised within the range of from 70° to 90° C., and for polymerization times comprised within the range of from 4 to 6 hours.

The olefinic monomers, which may be used either alone or as mixtures of two or more monomers, and together with carbon monoxide are alpha-olefins such as ethylene, propylene, butene-1, pentene-1, and so forth, cyclopentene and styrene; the preferred monomer is ethylene (C2), and the preferred monomer mixture is ethylene with propylene.

A major advantage displayed by the present invention, together to the previously mentioned advantage, of not requiring the complex methodologies for anchoring the catalyst to the carrier, is that the catalytic system is characterized by a considerable flexibility, requires easily synthetized palladium salts and the preliminary preparation of sofisticated bidentate ligands is not required, to the contrary of the prior art, with the production process being considerably simplified; in fact, the component (a) of the catalytic system which is the subject matter of the present invention, is constituted by commercially available or easily synthetized products, i.e., an inorganic carrier (preferably silica) and $Pd(O_2CNEt_2)_2(NHEt_2)_2$ complex.

Another advantage deriving from the use of the catalytic system according to the present invention is the possibility of obtaining an alternating copolymer the properties of which, such as, e.g., its melting temperature, its glass transition temperature (Tg) and its processability can be modulated by using one single olefin or a mixture of two or more olefins.

The general aspects of the instant invention having been disclosed, the following specific examples are supplied now for the only purpose of illustrating some details of the same invention, and which shall be regarded as in any way limitative thereof.

All the compositions and percent values reported are by weight unless differently specified.

EXAMPLE 1

Preparation of Pd[Pd(O$_2$CNEt$_2$)$_2$(NHEt$_2$)$_2$] carbamate

Bis(N,N-diethylcarbamate)bis-(diethylamino)palladium (II) was prepared as described in the literature by A. Aniilo, D. Belli Dell'Amico, F. Calderazzo, "Gazzetta Chimica Italiana", 119, pages 653–655, (1989).

EXAMPLE 2

Preparation of Siliceous Carrier

Ten grams of commercial silica, grade 3217-50 ex Grace, were heated up to 160° C. and were kept at this temperature, under reduced pressure (about 1 Pa) for 12 hours, in order to remove most adsorbed water. After this treatment, silica was allowed to cool under nitrogen and was stored for the reaction with the palladium salt.

The determination of residual OH content was carried out by weighing a sample of 2 g, under nitrogen, and calcining it at 800° C. for 10 hours. The sample was weighed again, and the weight was correlated with the initial OH amount according to the formula:

% OH=[weight loss (g) 2.17/18]×100/[sample weight (g)]

After drying at 160° C. under reduced pressure (about 1 Pa) for 12 hours, the OH level in the recovered silica was of 4.72%.

EXAMPLE 3

Preparation of the Component (a)

3.1 Preparation of the carrier; the method was followed which is disclosed in published Italian Patent Application No. 20,284 A/89;

13.2 g of silica dried according to the modality as disclosed in Example 2, were suspended in pure toluene (200 cm$^3$) and were treated with 1.96 g (4.02 mmol) of trans-Pd(O$_2$CNEt$_2$)$_2$(NHEt$_2$)$_2$ for 12 hours at room temperature with stirring, until the solution turned into colourless.

The resulting suspension contains 0.066 g of silica and 2.13 mg of Pd, calculated as metal, per each suspension cm$^3$.

3.2 By operating as disclosed under 3.1 above, the suspension obtained by reacting silica with Pd(O$_2$CNEt$_2$)$_2$(NHEt$_2$)$_2$ was filtered off and the cake was collected, washed with toluene and dried at room temperature and under vacuum (30 Pa). The end solid material, of pale yellow color was analyzed by atomic absorption in order to determine its Pd content, which resulted to be of 2.8%, as expressed as metal Pd.

The analysis demonstrated that all palladium introduced as Pd(O$_2$CNEt$_2$)$_2$(NHEt$_2$)$_2$ was anchored to the silica carrier.

EXAMPLE 4

1.3 l of methanol was added to an autoclave of 2 liters of capacity. Approximately 5 cm$^3$ (328 mg of solid matter, 10.6 mg of Pd) was added of the suspension prepared according to the modalities as of Example 3.1; also added were 0.1 mmol of 1,3-bis(diphenyl phosphino)propane and 2 mmol of trifluoroacetic acid. The autoclave was filled with a CO/ethylene mixture (molar ratio 1.1) up to the pressure of 56×10$^5$ Pa. The polymerization was carried out for 5 hours at 80° C., with the pressure being kept constant throughout the polymerization time.

The reactor was cooled down to room temperature and the residual gases were vented. The copolymer was filtered off, the filter cake was washed with methanol and was dried in an oven at 60° C. 100 g of polymer was obtained.

A further 2.3 g of polymer was mechanically collected by scraping the stirrer and the autoclave wall; therefore, the reactor fouling coefficient is assumed to have been:

(2.3/102.3)×100=2.2%

The inherent viscosity, as measured in metacresol at 100° C., was of 1.0 (dl/g).

EXAMPLE 5

The process was carried out by operating as in Example 4, except for the component (a) being prepared as disclosed in Example 3.2.

A mechanically stirred autoclave of 2 liters of capacity was charged with 1.3 liters of methanol, 378 mg of component (a) (10.64 mg of Pd, as elemental metal), 0.1 mmol of 1,3-bis(diphenyl phosphino)propane, 2 mmol of trifluoroacetic acid.

A 1:1 mixture of ethylene/CO was added up to an end pressure of 56×10$^5$ Pa. The pressure inside the autoclave was kept constant at that value throughout the reaction time. After 5 hours of polymerization at 80° C., the autoclave was cooled down to room temperature and the residual gases were vented. The copolymer suspended in the solvent was filtered off, the filter cake was washed with methanol and was dried and weighed.

110 g of polymer was obtained.

A further 3.2 g of polymer was collected by mechanically cleaning the stirrer and the autoclave wall; therefore, the reactor fouling coefficient (computed as in Example 4) resulted to be of 2.8%.

EXAMPLE 6 (COMPARISON EXAMPLE)

This example is reported in order to confirm that the palladium anchoring reaction is strongly depending on the nature of the palladium salt used as the starting compound.

Commercial Silica (Grace 3217-50) (13.2 g), pretreated as disclosed in Example 2, was suspended in 200 cm$^3$ of methanol, and was caused to react with Pd(CH$_3$COO)$_2$ (902 mg, 4.02 mmol), for 12 hours, at room temperature, with stirring.

The suspended solid matter was filtered off, the filter cake was washed with methanol and was dried at room temperature, under reduced pressure. Silica's Pd content was shown to be of 480 ppm (0.08%).

To an autoclave of 2 liters of capacity, 1.3 liters of methanol, 12.6 g of the above mentioned solid product (10.6 mg of Pd, 0.1 mmol), 0.1 mmol of 1,3-bis(diphenyl phosphino)propane and 2 mmol of trifluoroacetic acid were charged. The autoclave was filled with 56×10$^5$ Pa of an ethylene/CO mixture (1:1), and was heated up to 80° C. After 5 hours of reaction, the autoclave was cooled and the residual pressure was vented.

No measurable amounts of polymer were obtained.

The above reference Example demonstrates that a supported catalytic system is not obtained when a whatever Pd salt is used: such a catalytic system can only be obtained by using Pd(O$_2$CNEt$_2$)$_2$.(NHEt$_2$)$_2$, as claimed in the present invention.

EXAMPLE 7

By operating as disclosed in Example 3.2, 4.82 g of commercial silica (Grace 3217-50) was suspended in 200 cm$^3$ of toluene and to them 1.96 g (4.02 mmol) of Pd(O$_2$CNEt$_2$)$_2$.(NHEt$_2$)$_2$ was added. The reactants were caused to react at room temperature for 12 hours, then the solid reaction product was recovered. The Pd content, expressed as elemental metal, was of 5%.

An amount of 200 mg of the solid product prepared in that way was suspended inside an autoclave of 2 liters of capacity. Then 0.1 mmol of 1,3-bis(diphenyl phosphino)propane and 2 mmol of trifluoroacetic acid were added. The autoclave was filled to 56×10$^5$ Pa with a mixture of ethylene/CO in the ratio of 1:1. After 5 hours of reaction, the reactor was cooled and the polymer was recovered, washed and dried. 120 g of polymer with an inherent viscosity of 0.80 dl/g, as computed in m cresol at 100° C., was obtained.

EXAMPLE 8

By operating in the same way as disclosed in Example 3.2, 12.2 g of commercial silica (Grace 3217-50) was suspended in 200 cm$^3$ of toluene and then 0.98 g (2 mmol) of Pd(O$_2$CNEt$_2$)$_2$.(NHEt$_2$)$_2$ was added. The reaction mixture was kept stirred for 12 hours at room temperature and a solid with a Pd content of 1.5% was recovered.

To an autoclave of 2 liters of capacity, 1.3 l of methanol, 0.6 g of component (a) (10.6 mg of Pd), prepared as said, 0.1 mmol of 1,3-bis(diphenyl phosphino)propane and 2 mmol of trifluoroacetic acid were added. Then a mixture of ethylene/CO in the ratio of 1:1 by mol was added to the autoclave, up to an end pressure of 56×10$^5$ Pa.

After 5 hours of reaction at 80° C., the reactor was cooled and the polymer was recovered, filtered, washed and oven dried under vacuum at 60° C.

107 g of copolymer was obtained.

We claim:

1. A process for copolymerizing one or more olefins with carbon monoxide to form an alternating olefin/CO copolymer, comprising polymerizing said olefin(s) and said carbon monoxide in the presence of a heterogeneous catalyst, comprising:

(a) the solid compound produced from the interaction of

Pd(O$_2$CNEt$_2$)$_2$(NHEt$_2$)$_2$ with a solid carrier; wherein said solid carrier is an inorganic compound insoluble in usual solvents and has reactive functional groups on its surface (b) a ligand which is a mono- or bidentate ligand containing one or two nitrogen or phosphorus atoms capable of binding to Pd through active bonds wherein said monodentate ligand is an aliphatic, cycloaliphatic, or aromatic monophosphine, or an aliphatic or aromatic amine, and wherein said bidentate ligand forms a complex with Pd through both of its heteroatoms; and (c) a mineral acid or organic acid having a pKa less than 5.

2. The process of claim 1, wherein said olefin is an alpha-olefin.

3. The process of claim 1, wherein said polymerizing takes place in a sealed reactor by preliminary charging solvent, catalyst components, and olefin monomer(s), said polymerizing taking place at a temperature of from about 80° C. to about 100° C. at a pressure from about 4×10$^5$ Pa to about 100×10$^5$ Pa, for a period of from 3–9 hours.

4. The process of claim 1, wherein said polymerizing takes place in the presence of an alcoholic solvent, and wherein the molar ratio of CO/olefin(s) is from about 5:1 to about 1:5 under a pressure of from about 50×10$^5$ Pa to about 60×10$^5$, at a temperature of from about 70° C. to about 90° C., for a period of from about 4 to about 6 hours.

5. The process of claim 1, wherein the amount of catalyst is such that from 10$^{-2}$ to 10$^{-5}$ gram-atoms Pd are charged per mol of olefin.

6. The process of claim 1, wherein said olefin monomer is ethylene.

7. The process of claim 2, wherein said olefin monomer is ethylene.

8. The process of claim 3, wherein said olefin monomer is ethylene.

9. The process of claim 4, wherein said olefin monomer is ethylene.

10. The process of claim 5, wherein said olefin monomer is ethylene.

11. The process of claim 1, wherein said ligand is 1,3-bis(diphenylphosphino)propane.

12. The process of claim 2, wherein said ligand is 1,3-bis(diphenylphosphino)propane.

13. The process of claim 3, wherein said ligand is 1,3-bis(diphenylphosphino)propane.

14. The process of claim 4, wherein said ligand is 1,3-bis(diphenylphosphino)propane.

15. The process of claim 5, wherein said ligand is 1,3-bis(diphenylphosphino)propane.

* * * * *

UNITED STATES PATENT AND TRADEMARK OFFICE
CERTIFICATE OF CORRECTION

PATENT NO. : 5,408,030
DATED : April 18, 1995
INVENTOR(S) : Anna SOMMAZZI, et al.

It is certified that error appears in the above-indentified patent and that said Letters Patent is hereby corrected as shown below:

On the title page, Item [75], the fourth inventor's city of residence should read:

--Ghezzano--

Signed and Sealed this

Thirteenth Day of June, 1995

Attest:

BRUCE LEHMAN

*Attesting Officer*  *Commissioner of Patents and Trademarks*